US009014291B2

(12) United States Patent
Gao et al.

(10) Patent No.: US 9,014,291 B2
(45) Date of Patent: Apr. 21, 2015

(54) METHOD AND APPARATUS FOR ANALYZING CROSSTALK BETWEEN LINES

(71) Applicant: Huawei Technologies Co., Ltd., Shenzhen (KR)

(72) Inventors: Yahong Gao, Shenzhen (CN); Jianping Tu, Shenzhen (CN); Dawei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/176,227

(22) Filed: Feb. 10, 2014

(65) Prior Publication Data

US 2014/0153629 A1 Jun. 5, 2014

Related U.S. Application Data

(63) Continuation of application No. PCT/CN2011/078202, filed on Aug. 10, 2011.

(51) Int. Cl.
*H04B 7/02* (2006.01)
*H04L 1/02* (2006.01)
*H04B 3/46* (2006.01)
*H04M 3/34* (2006.01)
(Continued)

(52) U.S. Cl.
CPC *H04B 3/464* (2013.01); *H04B 3/32* (2013.01); *H04M 3/34* (2013.01); *H04M 11/062* (2013.01); *H04B 3/487* (2015.01)

(58) Field of Classification Search
CPC .................................. H04B 3/32; H04B 3/464
USPC .................................. 375/227, 219, 260, 267
See application file for complete search history.

(56) References Cited

U.S. PATENT DOCUMENTS 6,650,697 B1 * 11/2003 Tate et al. ...................... 375/222
7,356,049 B1 * 4/2008 Rezvani ........................ 370/484
(Continued)

FOREIGN PATENT DOCUMENTS

CN 1863099 11/2006
CN 1937433 3/2007
(Continued)

OTHER PUBLICATIONS

International Search Report mailed May 24, 2012 in corresponding International Patent Application No. PCT/CN2011/078202.
Extended European Search Report issued on Jul. 16, 2014 in corresponding European Patent Application No. 11 86 0492.5.
(Continued)

*Primary Examiner* — Freshteh N Aghdam
(74) *Attorney, Agent, or Firm* — Staas & Halsey LLP (57) ABSTRACT

Embodiments of the present invention provide a method and an apparatus for analyzing crosstalk between lines, where the method includes: performing frequency spectrum notching on a specific frequency band of lines of which the number is a first number among multiple lines, collecting a first group of state performance parameters of each line of lines of which the number is a second number among the multiple lines; canceling frequency spectrum notching on the specific frequency band of the to-be-analyzed line, collecting a second group of state performance parameters of each line of the lines of which the number is the second number; and determining, according to the first and second groups of state performance parameters, crosstalk of each line of the lines of which the number is the second number into the to-be-analyzed line on the specific frequency band.

15 Claims, 4 Drawing Sheets

(51) Int. Cl.
*H04M 11/06* (2006.01)
*H04B 3/32* (2006.01)

(56) References Cited

U.S. PATENT DOCUMENTS

| | | | |
|---|---|---|---|
| 2002/0041565 A1* | 4/2002 | Valenti et al. | 370/201 |
| 2006/0039456 A1 | 2/2006 | Bostoen et al. | |
| 2007/0036340 A1 | 2/2007 | Rhee et al. | |
| 2007/0047631 A1 | 3/2007 | Bostoen et al. | |
| 2008/0188185 A1 | 8/2008 | Shi | |
| 2009/0073868 A1 | 3/2009 | Guenach et al. | |
| 2011/0110408 A1* | 5/2011 | Schwager et al. | 375/222 |
| 2012/0075984 A1 | 3/2012 | Cendrillon et al. | |

FOREIGN PATENT DOCUMENTS

| | | |
|---|---|---|
| CN | 101388749 | 3/2009 |
| CN | 101908909 | 12/2010 |
| EP | 1630968 A1 | 3/2006 |
| WO | WO 2006/129140 | 12/2006 |
| WO | WO 2006129140 A1 * | 12/2006 |
| WO | 2009/122410 A2 | 10/2009 |

OTHER PUBLICATIONS

Chinese Office Action dated Feb. 5, 2013 in corresponding Chinese Patent Application No. 201180001872.4.
Chinese Search Report dated Jan. 25, 2013 in corresponding Chinese Patent Application No. 2011800018724.
PCT International Search Report and Written Opinion of the International Searching Authority issued May 24, 2012 in corresponding International Patent Application No. PCT/CN2011/078202.
"Series G: Transmission Systems and Media, Digital Systems and Networks; Digital sections and digital line system—Access networks; Test procedures for digital subscriber line (DSL) transceivers", ITU-T, G.996.1, Feb. 2001, 86 pp.
"Series G: Transmission Systems and Media, Digital Systems and Networks; Digital sections and digital line system—Access networks; Very high speed digital subscriber line transceivers 2 (VDSL2); Amendment 7", ITU-T, G.993.2, Amendment 7, Jun. 2011, 82 pp.
"Series G: Transmission Systems and Media, Digital Systems and Networks; Digital sections and digital line system—Access networks; Asymmetric Digital Subscriber Line (ADSL) transceivers—Extended bandwidth ADSL2 (ADSL2plus)", ITU-T, G.992.5, Jan. 2009, 139 pp.

* cited by examiner

METHOD AND APPARATUS FOR ANALYZING CROSSTALK BETWEEN LINES

CROSS-REFERENCE TO RELATED APPLICATIONS

This application is a continuation of International Application No. PCT/CN2011/078202, filed on Aug. 10, 2011, which is hereby incorporated by reference in its entirety.

TECHNICAL FIELD

Embodiments of the present invention relate to the data communication field, and in particular, to a method and an apparatus for analyzing crosstalk between lines.

BACKGROUND xDSL is a collective name of all DSL (Digital Subscriber Line, digital subscriber line) technologies, and a technology for transmitting high-speed data on a telephone twisted-pair cable. A manner of frequency division multiplexing is commonly adopted to simultaneously transmit an xDSL and a POTS (Plain Old Telephone Service, plain old telephone service) on a twisted-pair cable, where the xDSL occupies a high frequency band part, the POTS occupies a baseband part lower than 4 KHz, and signals on the two parts are divided by a divider. A system for providing multiple lines of xDSL access is called a DSLAM (DSL Access Multiplexer, DSL access multiplexer).

With the development of the xDSL technology, the xDSL technology utilizes an increasingly wider frequency band, and bears an increasingly higher speed. With an increase in a frequency band, crosstalk between twisted-pair cables has an increasingly larger impact, especially in the high frequency band part. Crosstalk is generally categorized as near-end crosstalk (NEXT) and far-end crosstalk (FEXT). Because uplink and downlink channels of an xDSL adopt frequency division multiplexing, an impact of the NEXT on a system may be ignored. However, the FEXT has a big impact on transmission performance of a line. Therefore, a method for effectively determining a source of crosstalk between lines and a crosstalk relationship between lines is needed.

The following method is proposed to determine a source of crosstalk between lines and crosstalk between lines. In the method, within a fixed time interval, transmission power of a line (referred to as a line 2 in the following) and a signal-to-noise ratio of another line (referred to as a line 1 in the following) are collected with each subcarrier as a unit; a variance of the transmission power of the line 2 is determined; noise on the line 1 is determined; a coefficient of crosstalk of the line 2 into the line 1 at a specific frequency point is determined, that is, the crosstalk of the line 2 into the line 1 at the specific frequency point is determined. However, the foregoing method has the following problems: When an environment where a line works is relatively steady, and a transmission power spectrum of the line is also relatively stable, a variance occurs rarely. Therefore, it may take a long time to make collected data meet conditions of validity, resulting in that a long time is taken for crosstalk analysis and determination, and even an effective result cannot be obtained through convergence.

To resolve the foregoing problem, an improved solution of the foregoing method is further proposed, and in the solution, a transmission power spectrum is actively changed. However, a problem of the solution lies in that when a crosstalk source of a line or a crosstalk relationship between a line and another line needs to be tested, operations, such as frequent changing of a configuration and deactivation on all lines, are needed, thereby seriously affecting a normal service.

SUMMARY

Embodiments of the present invention provide a method and an apparatus for analyzing crosstalk between lines, which implement quick crosstalk analysis and identification by adopting an active configuration of frequency spectrum notching while having a little impact on a normal service.

According to one aspect of the embodiments of the present invention, a method for analyzing crosstalk between lines is provided, where the method includes: performing frequency spectrum notching on a specific frequency band of lines of which the number is a first number among multiple lines, collecting a first group of state performance parameters of each line of lines of which the number is a second number among the multiple lines, where the lines of which the number is the first number include a to-be-analyzed line; canceling frequency spectrum notching on the specific frequency band of the to-be-analyzed line, and collecting a second group of state performance parameters of each line of the lines of which the number is the second number; and determining, according to the first and second groups of state performance parameters, crosstalk of each line of the lines of which the number is the second number into the to-be-analyzed line on the specific frequency band.

According to another aspect of the embodiments of the present invention, a method for analyzing crosstalk between lines is provided, where the method includes: performing frequency spectrum notching on a specific frequency band of lines of which the number is a first number among multiple lines, collecting a first group of state performance parameters of each line of lines of which the number is a second number among the multiple lines, where the lines of which the number is the first number include to-be-analyzed lines of which the number is a specific number; canceling frequency spectrum notching on a specific frequency band of a to-be-analyzed line whose frequency spectrum notching is not canceled among the to-be-analyzed lines of which the number is the specific number, and collecting a second group of state performance parameters of each line of the lines of which the number is the second number; determining, according to the first and second groups of state performance parameters, crosstalk of each line of the lines of which the number is the second number into the to-be-analyzed line on the specific frequency band; and determining whether a line whose frequency spectrum notching is not canceled exists in the to-be-analyzed lines of which the number is the specific number, where when a line whose frequency spectrum notching is not canceled exists, the method returns to canceling frequency spectrum notching on a specific frequency band of a to-be-analyzed line whose frequency spectrum notching is not canceled among the to-be-analyzed lines of which the number is the specific number, and collecting a second group of state performance parameters of each line of the lines of which the number is the second number; and when no line whose frequency spectrum notching is not canceled exists, the method ends.

According to another aspect of the embodiments of the present invention, an apparatus for analyzing crosstalk between lines is provided, where the apparatus includes: a data collector, configured to collect state performance parameters of a line; a configurator, configured to perform frequency spectrum notching on a specific frequency band of a line or cancel frequency spectrum notching on the specific frequency band of the line; and an analysis controller, configured to control an operation by the configurator of frequency spectrum notching or canceling frequency spectrum notching, obtain the state performance parameters of the line from the data collector, and determine crosstalk of a line into another line according to the obtained state performance parameters.

In the embodiments of the present invention, an operation of frequency spectrum notching is performed by adopting an active configuration, and therefore, compared with a solution in the prior art of passively waiting for each line to send a power spectrum change to calculate a crosstalk relationship, thereby resulting in a slow convergence speed or even no convergence, in the embodiments of the present invention, a crosstalk relationship between lines can be quickly obtained within a short period of time while an impact on a normal communication service of an xDSL is very little.

BRIEF DESCRIPTION OF DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

First, a principle of crosstalk analysis according to the embodiments of the present invention is explained.

Figure 1:
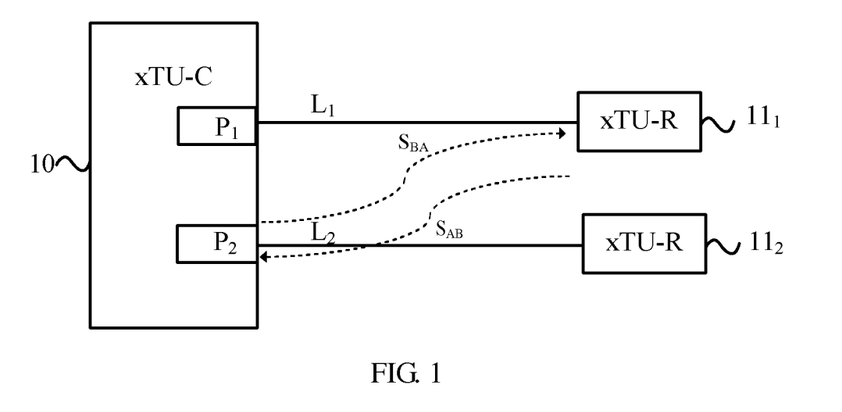
FIG. 1 is a schematic diagram for explaining a crosstalk dual relationship.

FIG. 1 is a schematic diagram for explaining a crosstalk dual relationship.

Referring to FIG. 1, an xTU-C (xDSL transceiver unit-central office end, xDSL transceiver unit-central office end) 10 includes a port $P_1$ and a port $P_2$, where the port $P_1$ and the port $P_2$ are connected to one end of a line $L_1$ and one end of a line $L_2$, respectively. The other ends of the line $L_1$ and the line $L_2$ are connected to an xTU-R (xDSL transceiver unit-remote end, xDSL transceiver unit-remote end) $11_1$ and an xTU-R $11_2$, respectively. To simplify description, FIG. 1 shows only the two ports $P_1$ and $P_2$ of the xTU-C 10, the two lines $L_1$ and $L_2$, and two xTU-Rs, but, one xTU-C may include more than two ports, so as to connect to more than two lines and more than two xTU-Rs.

As shown in FIG. 1, far-end crosstalk between the two lines $L_1$ and $L_2$ includes two directions: a downlink direction and an uplink direction, coefficients of downlink direction crosstalk of $L_2$ into $L_1$ and uplink direction crosstalk of $L_1$ into $L_2$ have a dual relationship. Assume that a coefficient of downlink direction crosstalk of $L_2$ into $L_1$ is represented by $S_{BA}$, and a coefficient of uplink direction crosstalk of $L_1$ into $L_2$ is represented by $S_{AB}$, and because xTU-C and xTU-R devices perform impedance matching on lines in a operating process, the two crosstalk coefficients have a dual relationship, that is to say, $S_{BA}(f)=S_{AB}(f)$, which means that the two crosstalk coefficients are equal in a case that frequencies are the same. Therefore, after crosstalk of a certain direction (uplink/downlink) of a specific line into another line is obtained, crosstalk of the other direction (downlink/uplink) of the another line into the specific line can be obtained.

Second, a system that applies a method for analyzing crosstalk between lines according to an embodiment of the present invention is described through examples.

Figure 2:
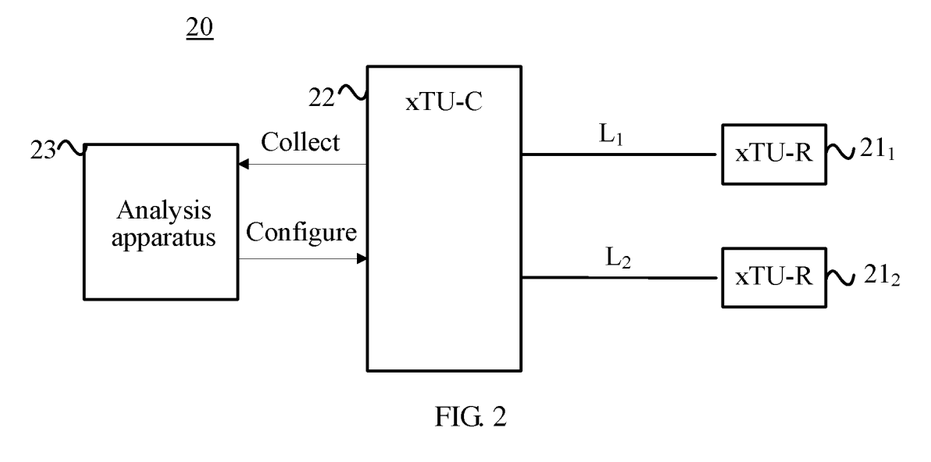
FIG. 2 is a schematic block diagram of a system that applies a method for analyzing crosstalk between lines according to an embodiment of the present invention.

FIG. 2 is a schematic block diagram of a system 20 that applies a method for analyzing crosstalk between lines according to an embodiment of the present invention.

Referring to FIG. 2, the system 20 includes an xTU-R $21_1$, an xTU-R $21_2$, an xTU-C 22 and an analysis apparatus 23, where the xTU-C 22 is connected to the xTU-R $21_1$ and the xTU-R $21_2$ through two lines $L_1$ and $L_2$, respectively, and the analysis apparatus 23 is connected to the xTU-C 22. The analysis apparatus collects state performance parameters of the lines $L_1$ and $L_2$ from the xTU-C 22, delivers a control parameter to the xTU-C device for a corresponding configuration, for example, performing frequency spectrum notching, and determines a crosstalk source of a specific line and a crosstalk relationship between the specific line and another line according to the collected state performance parameters. To simplify description, FIG. 2 only shows that the xTU-C 22 is connected to two xTU-Rs, but one xTU-C may be connected to more than two xTU-Rs, so as to analyze crosstalk among more than two lines.

Specific embodiments of a method for analyzing crosstalk between lines according to embodiments of the present invention are described in detail in the following.

In the method for analyzing crosstalk between lines provided by the embodiments of the present invention, quick crosstalk analysis and identification can be implemented by adopting an active configuration of frequency spectrum notching, while an impact on a normal service is very little.

Figure 3:
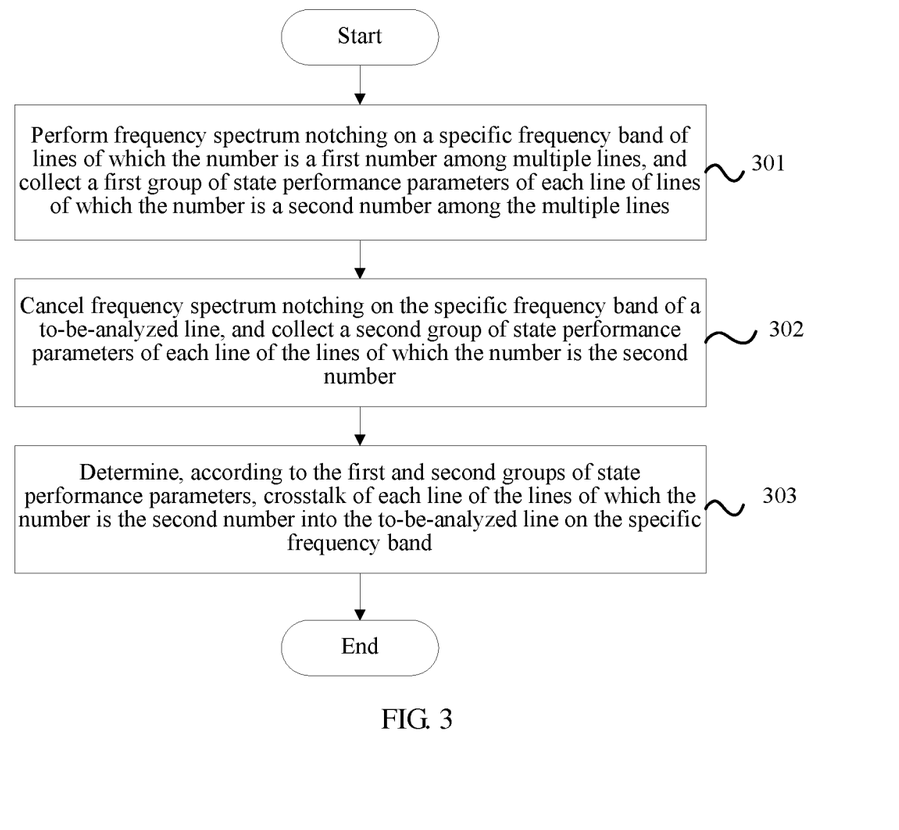
FIG. 3 is a flow chart of a method for analyzing crosstalk between lines according to an embodiment of the present invention.

FIG. 3 is a flow chart of a method for analyzing crosstalk between lines according to an embodiment of the present invention.

Referring to FIG. 3, in step 301, perform frequency spectrum notching on a specific frequency band of lines of which the number is a first number among multiple lines, and collect a first group of state performance parameters of each line of lines of which the number is a second number among the multiple lines, where the lines of which the number is the first number include a to-be-analyzed line.

To be specific, first, a to-be-analyzed line P is determined, and the to-be-analyzed line may be a line with a crosstalk problem. For example, through analyzing a DSL communication parameter or testing, it is found that a certain direction (for example, a downlink direction) of a certain DSL line has excessively loud crosstalk noise, then the line may be determined as a to-be-analyzed line. However, this embodiment is not limited to this, for example, any one or multiple lines may be specified, according to a demand, as a to-be-analyzed line or multiple to-be-analyzed lines. In addition, descriptions in the following all take a downlink direction as an example, and a method for analyzing uplink direction crosstalk is the same as a method for analyzing downlink direction crosstalk, and therefore, is not repeatedly described in the present specification.

Second, a line needing frequency spectrum notching is determined, and the line may be all lines possibly having crosstalk into the to-be-analyzed line P. For example, all lines connected to a same xTU-C together with the line P. However, this embodiment is not limited to this, for example, a user may specify, according to a demand, a line needing frequency spectrum notching.

Third, uplink frequency spectrum notching is performed on the line needing frequency spectrum notching.

A concept of frequency spectrum notching is first introduced. Assume that a certain frequency band in an uplink direction of a certain line has relatively high transmission power, and if notching is performed on a transmission frequency spectrum, the transmission power is substantially reduced on a relatively narrow frequency band to ensure that crosstalk of the narrow frequency band into other lines is smaller than a noise floor of each line. Due to modulation and coding technologies adopted by a DSL, each sub-frequency band can relatively independently complete a communication function, but there are few sub-frequency bands undergoing notching in the embodiment, so that a little impact or no impact is made on DSL communication.

Manners of performing frequency spectrum notching on a line are explained in the following through examples.

According to an embodiment of the present invention, frequency spectrum notching may be implemented in a manner of configuring a MIB PSD MASK (Management Information Base Power Spectral Density, management information base power spectral density mask).

Besides, when the manner of configuring a MIB PSD MASK is adopted, various specific requirements need to be met, for example, a frequency spectrum shape after frequency spectrum notching is stipulated in 7.2.1.1.2.3.2 of ITU-T G993.2 (refer to ITU-T Recommendation G993.2, Very high speed digital subscriber line transceivers 2(VSDL2)).

According to another embodiment of the present invention, frequency spectrum notching may be implemented in a manner of configuring RFI (Radio Frequency Interference, radio frequency interference) frequency band, for example, frequency spectrum notching may be implemented according to a corresponding requirement in ITU-T G992.5 or G993.2 (refer to ITU-T Recommendation G992.5, Asymmetric Digital Subscriber Line (ADSL) transceivers—Extended bandwidth ADSL2 (ADSL2+) and ITU-T Recommendation G993.2, Very high speed digital subscriber line transceivers 2(VSDL2)).

Manners of performing frequency spectrum notching are described in the foregoing through examples, but the embodiments of the present invention are not limited to the foregoing manners of performing frequency spectrum notching, and in the embodiments of the present invention, other manners of performing frequency spectrum notching may also be adopted.

Finally, state performance parameters of lines are collected. State performance parameters of all lines may be collected, or state performance parameters of a part of lines may be collected, and the user may specify, according to a demand, a line whose state performance parameters need to be collected. Besides, the state performance parameters include, but are not limited to, transmission power, line attenuation, a signal-to-noise ratio (SNR) and so on of each sub-frequency band of each line in an uplink direction.

In step 302, cancel frequency spectrum notching on the specific frequency band of the to-be-analyzed line, and collect a second group of state performance parameters of each line of the lines of which the number is the second number.

In step 303, determine, according to the first and second groups of state performance parameters, crosstalk of each line of the lines of which the number is the second number into the to-be-analyzed line on the specific frequency band.

A process of determining crosstalk of each line of the lines of which the number is the second number into the to-be-analyzed line on the specific frequency band is described in the following through examples.

According to the concept of frequency spectrum notching, crosstalk of a frequency spectrum notching narrow frequency band into other lines is smaller than a noise floor of each line, and therefore, it may be assumed that all noise floors are higher than crosstalk on a notched frequency band after frequency spectrum notching, and a collected uplink signal-to-noise ratio of each line may be represented as follows:

$$SNR_n = \frac{TxPSD_n}{\text{Noise}/H_{nn}}, \quad (1)$$
$$n = 1, \ldots, N$$

where $TxPSD_n$ is uplink transmission power on a notched frequency band of each line, Noise is a noise floor of a line, $H_{nn}$ is a transmission function of the line (that is, line attenuation), and n represents a line serial number and is a natural number.

After canceling frequency spectrum notching of the to-be-analyzed line P, a collected uplink signal-to-noise ratio of each line on an original notched frequency band may be represented as follows:

$$SNR'_n = \frac{TxPSD_n}{TxPSD_P \cdot H_{nP}/H_{nn} + \text{Noise}/H_{nn}}, \quad (2)$$
$$n = 1, \ldots, N$$

where $TxPSD_P$ represents a transmission function of the line, and $H_{nP}$ represents a coefficient of crosstalk of the uplink direction of the line P into a line n.

A coefficient of crosstalk of the uplink direction of the to-be-analyzed line P into any line n may be calculated according to the formulas (1) and (2):

$$H_{nP-US} = \frac{TxPSD_n}{TxPSD_P} \cdot H_{nn} \cdot \left(\frac{1}{SNR'} - \frac{1}{SNR}\right), \quad (3)$$
$$n = 1, \ldots, N$$

According to a crosstalk dual principle, a coefficient of crosstalk of a downlink direction of the line n into the to-be-analyzed line P on a notched frequency band is:

$$H_{Pn-DS} = H_{nP-US}$$

The method for analyzing crosstalk between lines according to the embodiment of the present invention is described in the foregoing, and application of the foregoing crosstalk analysis result is introduced in the following.

According to an embodiment of the present invention, a crosstalk source of a to-be-analyzed line may be determined by using the foregoing crosstalk analysis result. Though only a coefficient of crosstalk of each line into the line P on a notched frequency band is calculated in the foregoing, the crosstalk coefficient also reflects crosstalk relative strength on all frequency bands. Therefore, the crosstalk source of the to-be-analyzed line may be determined according to the crosstalk relative strength, so as to perform a modification or maintenance of the line, for example, a line whose coefficient of crosstalk into the to-be-analyzed line is relatively large may be determined as a crosstalk source, or a line whose coefficient of crosstalk into the to-be-analyzed line is larger than a certain threshold may be determined as a crosstalk source, but the embodiment is not limited to the foregoing, and a manner of determining a crosstalk source may be set according to a demand.

According to another embodiment of the present invention, crosstalk of each line into the to-be-analyzed line on all frequency bands may be deduced according to a crosstalk model in ITU-T G996.1 by using the foregoing crosstalk analysis result, and the crosstalk model is:

$$|H_{FEXT}(f)|^2 = |H_{channel}(f)|^2 \times k \times l \times f^2 \quad (4)$$

where $|H_{channel}(f)|$ is a channel transmission function, and may be obtained through estimation by using collected line attenuation, l is a coupling length, k is a coupling constant, and f is a frequency.

$k \times l$ may be obtained through a calculation according to crosstalk $|H_{FEXT}(f)|$ obtained on a notched frequency band, and therefore, crosstalk on all frequency bands may be determined. Frequency spectrum planning and frequency spectrum management may be further conducted according to detailed crosstalk information.

Figure 4:
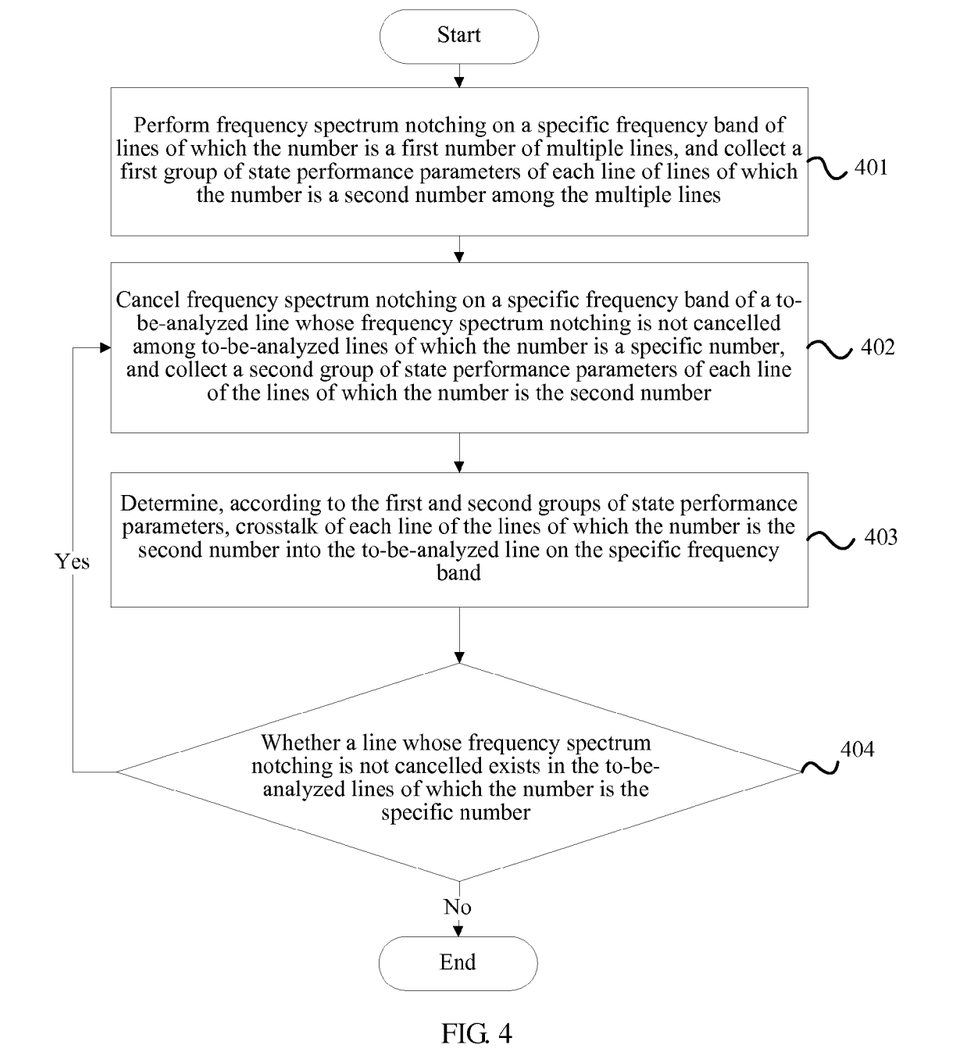
FIG. 4 is a flow chart of a method for analyzing crosstalk between lines according to another embodiment of the present invention.

FIG. 4 is a flow chart of a method for analyzing crosstalk between lines according to another embodiment of the present invention.

The method shown in FIG. 4 is different from the method shown in FIG. 3 in that crosstalk of multiple or all lines may be obtained through analysis. To avoid repetition, content same as that in the method described in FIG. 3 is not described again.

In step 401, perform frequency spectrum notching on a specific frequency band of lines of which the number is a first number of multiple lines, collect a first group of state performance parameters of each line of lines of which the number is a second number among the multiple lines, where the lines of which the number is the first number include to-be-analyzed lines of which the number is a specific number, the specific number is larger than or equal to 2, and may be the number of the multiple lines at most. That is to say, the method shown in FIG. 4 can analyze crosstalk among multiple lines or even all lines.

In step 402, cancel frequency spectrum notching on a specific frequency band of a to-be-analyzed line P whose frequency spectrum notching is not canceled among the to-be-analyzed lines of which the number is the specific number, and collect a second group of state performance parameters of each line of the lines of which the number is the second number.

In step 403, determine, according to the first and second groups of state performance parameters, crosstalk of each line of the lines of which the number is the second number into the to-be-analyzed line P on the specific frequency band.

In step 404, determine whether a line whose frequency spectrum notching is not canceled exists in the to-be-analyzed lines of which the number is the specific number, where when a line whose frequency spectrum notching is not canceled exists, the method returns to step 402; and when no line whose frequency spectrum notching is not canceled exists, the method ends.

As described above, according to the method for analyzing crosstalk between lines provided by the embodiment of the present invention, frequency spectrum notching is performed by adopting an active configuration, and therefore, compared with a solution in the prior art of passively waiting for each line to send power spectrum change to calculate a crosstalk relationship, according to the method provided in the embodiment of the present invention, a crosstalk relationship between lines can be quickly obtained within a short period of time; in addition, in a frequency spectrum notching technology, transmission power is substantially reduced within a relatively narrow frequency band to ensure that crosstalk of the narrow frequency band into other lines is smaller than a noise floor of each line, and due to modulation and coding technologies adopted by a DSL, each sub-frequency band can relatively independently complete a communication function, and there are few sub-frequency bands undergoing notching according to the method provided in the embodiments of the present invention, so that a little impact is made on a normal communication service of the DSL; furthermore, according to the method for analyzing crosstalk between lines provided by the embodiment of the present invention, all crosstalk sources in a certain direction may be obtained through one configuration by using an uplink and downlink crosstalk dual relationship, and therefore, according to the method provided by the embodiment of the present invention, simple and quick crosstalk analysis and identification can be implemented while an impact on a normal service is very little.

An apparatus for analyzing crosstalk between lines according to an embodiment of the present invention is described in detail in the following.

The apparatus for analyzing crosstalk between lines provided by the embodiment of the present invention can implement quick crosstalk analysis and identification by adopting an active configuration of frequency spectrum notching while having a little impact on a normal service.

Figure 5:
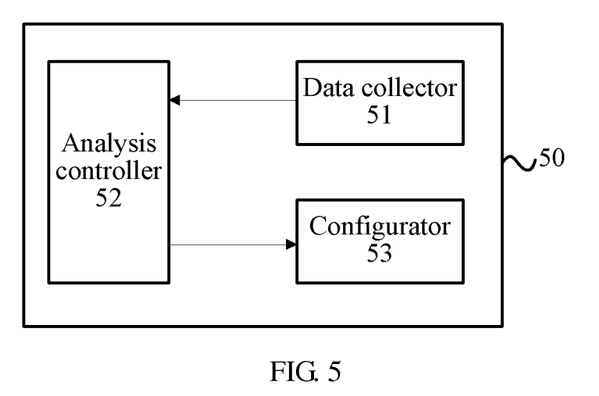
FIG. 5 is a schematic block diagram of an apparatus for analyzing crosstalk between lines according to an embodiment of the present invention.

FIG. 5 is a schematic block diagram of an apparatus 50 for analyzing crosstalk between lines according to an embodiment of the present invention.

As shown in FIG. 5, the apparatus 50 for analyzing crosstalk between lines includes a data collector 51, an analysis controller 52 and a configurator 53.

The data collector 51 is configured to collect state performance parameters of a line. The configurator 53 is configured to perform frequency spectrum notching on a specific frequency band of a line or cancel frequency spectrum notching on the specific frequency band of the line. The analysis controller 52 is configured to control an operation by the configurator 53 of frequency spectrum notching or canceling frequency spectrum notching, obtain the state performance parameters of the line from the data collector 51, and determine crosstalk of a line into another line according to the obtained state performance parameters.

All parts of the apparatus 50 for analyzing crosstalk between lines may implement all processes described from FIG. 3 to FIG. 4.

For example, according to the embodiment of the present invention, the analysis controller 52 controls the configurator 53 to perform frequency spectrum notching on a specific frequency band of lines of which the number is a first number of multiple lines, and obtains, from the data collector 51, a first group of state performance parameters of each line of lines of which the number is a second number of the multiple lines, where the lines of which the number is the first number include a to-be-analyzed line; controls the configurator 53 to cancel frequency spectrum notching on the specific frequency band of the to-be-analyzed line, and obtains, from the data collector 51, a second group of state performance parameters of each line of the lines of which the number is the second number again; and determines, according to the first and second groups of state performance parameters, crosstalk of each line of the lines of which the number is the second number into the to-be-analyzed line on the specific frequency band.

The analysis controller 52 determines, according to the first and second groups of state performance parameters, crosstalk of the to-be-analyzed line into each line of the lines of which the number is the second number on the specific frequency band; and determines, based on the crosstalk of the to-be-analyzed line into each line of the lines of which the number is the second number on the specific frequency band and according to a crosstalk dual relationship, the crosstalk of each line of the lines of which the number is the second number into the to-be-analyzed line on the specific frequency band.

The analysis controller 52 determines, according to transmission power, line attenuation, and a signal-to-noise ratio which are of each line of the lines of which the number is the second number on the specific frequency band and are included in the first and second groups of state performance parameters, the crosstalk of each line of the lines of which the number is the second number into the to-be-analyzed line on the specific frequency band.

The analysis controller 52 determines a crosstalk source of the to-be-analyzed line according to the determined crosstalk of each line of the lines of which the number is the second number into the to-be-analyzed line on the specific frequency band.

The analysis controller 52 determines a line which is in the lines of which the number is the second number and whose crosstalk into the to-be-analyzed line on the specific frequency band is larger than a threshold as the crosstalk source.

The analysis controller 52 determines, according to determined crosstalk of a specific line of the lines of which the number is the second number into the to-be-analyzed line on the specific frequency band, crosstalk of the specific line into the to-be-analyzed line on another frequency band.

The analysis controller 52 determines the crosstalk $|H_{FEXT}(f)|$ of the specific line into the to-be-analyzed line on the another frequency band according to the following formula: $|H_{FEXT}(f)|^2 = |H_{channel}(f)|^2 \times k \times l \times f^2$, where $|H_{channel}(f)|$ represents a channel transmission function, and is obtained according to collected line attenuation; l represents a coupling length; k represents a coupling constant; and f represents a frequency.

Therefore, in the apparatus for analyzing crosstalk between lines according to the embodiment of the present invention, the analysis controller 52 collects state performance parameters of a DSL line from the data collector 51, the configurator 53 performs a corresponding configuration (for example, performing an operation of frequency spectrum notching or canceling frequency spectrum notching on a specific frequency band of a specific line), and through the foregoing collecting, analyzing and configuration operations, a crosstalk source of a specific line may be obtained finally, and a crosstalk relationship between lines may also be obtained.

Though in this embodiment, the data collector and the configurator are described as independent units, either or both of the data collector and the configurator may also be integrated into the analysis controller. In addition, the data collector and the configurator may also be functions provided by a third party.

Furthermore, though the embodiments of the present invention are described in the foregoing with reference to an xDSL communication system, the technical solutions according to the embodiments of the present invention may also be applied to other communication and control systems. The technical solutions according to the embodiments of the present invention may be adopted as long as, in the communication and control systems, uplink and downlink channels are multiplexed and a frequency spectrum can be configured independently.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention is subject to the protection scope of the claims.

What is claimed is:

1. A method for analyzing crosstalk between lines, comprising:

performing frequency spectrum notching on a frequency band of lines of which a number of lines is a first number of lines from among multiple lines, collecting a first group of state performance parameters of lines which number of lines is a second number of lines from among the multiple lines, wherein the first number of lines comprise a to-be-analyzed line;

canceling frequency spectrum notching on the frequency band of the to-be-analyzed line, and collecting a second group of state performance parameters of the second number of lines; and determining, according to the first and the second groups of state performance parameters, crosstalk of the second number of lines into the to-be-analyzed line on the frequency band.

2. The method according to claim 1, wherein the first and the second groups of state performance parameters comprise transmission power, line attenuation and a signal-to-noise ratio of the second number of lines on the frequency band, and the determining, according to the first and second groups of state performance parameters, crosstalk of the second number of lines into the to-be-analyzed line on the frequency band comprises:

determining, according to the transmission power, the line attenuation and the signal-to-noise ratio which are of the second number of lines on the frequency band and are comprised in the first and second groups of state performance parameters, the crosstalk of the second number of lines into the to-be-analyzed line on the frequency band.

3. The method according to claim 1, wherein the determining, according to the first and second groups of state performance parameters, crosstalk of the second number of lines into the to-be-analyzed line on the frequency band comprises:

determining, according to the first and the second groups of state performance parameters, crosstalk of the to-be-analyzed line into the second number of lines on the frequency band; and determining, based on the crosstalk of the to-be-analyzed line into the second number of lines on the frequency band and according to a crosstalk dual relationship, the crosstalk of the second number of lines into the to-be-analyzed line on the frequency band.

4. The method according to claim 1, further comprising:
determining a crosstalk source of the to-be-analyzed line according to the determined crosstalk of the second number of lines into the to-be-analyzed line on the frequency band.

5. The method according to claim 4, wherein the determining a crosstalk source of the to-be-analyzed line according to the determined crosstalk of the second number of lines into the to-be-analyzed line on the frequency band comprises:
determining a line which is in the second number of lines and which crosstalk into the to-be-analyzed line on the frequency band is larger than a threshold as the crosstalk source of the to-be-analyzed line.

6. The method according to claim 1, further comprising:
determining, according to determined crosstalk of a line in the second number of lines into the to-be-analyzed line on the frequency band, crosstalk of the line into the to-be-analyzed line on another frequency band.

7. The method according to claim 6, wherein the determining, according to determined crosstalk of the line in the second number of lines into the to-be-analyzed line on the frequency band, crosstalk of the line into the to-be-analyzed line on another frequency band comprises:
determining the crosstalk $|H_{FEXT}(f)|$ of the line into the to-be-analyzed line on the another frequency band according to the following formula:

$$|H_{FEXT}(f)|^2 = |H^{channel}(f)|^2 \times k \times l \times f^2,$$

wherein $|H_{channel}(f)|$ represents a channel transmission function, and is obtained according to collected line attenuation; l represents a coupling length; k represents a coupling constant; and f represents the frequency of another band.

8. A method for analyzing crosstalk between lines, comprising:
performing frequency spectrum notching on a frequency band of lines of which a number of lines is a first number of lines from among multiple lines, collecting a first group of state performance parameters of lines which number of lines is a second number of lines from among the multiple lines, wherein the first number of lines comprise to-be-analyzed lines;
canceling frequency spectrum notching on a frequency band of a to-be-analyzed line which frequency spectrum notching is not canceled from among the to-be-analyzed lines, and collecting a second group of state performance parameters of the second number of lines;
determining, according to the first and the second groups of state performance parameters, crosstalk of the second number of lines into the to-be-analyzed line on the frequency band; and
determining whether a line which frequency spectrum notching is not canceled exists in the to-be-analyzed lines, wherein when a line which frequency spectrum notching is not canceled exists, returning to canceling frequency spectrum notching on a frequency band of a to-be-analyzed line which frequency spectrum notching is not canceled from among the to-be-analyzed lines, and collecting the second group of state performance parameters of the second number of lines, until when no line which frequency spectrum notching is not canceled exists.

9. An apparatus for analyzing crosstalk between lines, comprising:
a data collector, configured to collect state performance parameters of a line;

a configurator, configured to perform frequency spectrum notching on a frequency band of a line or cancel frequency spectrum notching on the frequency band of the line; and
an analysis controller, configured to control the configurator for the frequency spectrum notching or the canceling of frequency spectrum notching, obtain the state performance parameters of the line from the data collector, and determine crosstalk of a line into another line according to the obtained state performance parameters,
wherein the analysis controller:
controls the configurator to perform frequency spectrum notching on a frequency band of lines of which a number of lines is a first number of lines from among multiple lines, and obtains, from the data collector, a first group of state performance parameters of lines which number of lines is a second number of lines from among the multiple lines, wherein the first number of lines comprise a to-be-analyzed line;
controls the configurator to cancel frequency spectrum notching on the frequency band of the to-be-analyzed line, and obtains, from the data collector, a second group of state performance parameters of the second number of lines; and
determines, according to the first and the second groups of state performance parameters, crosstalk of the second number of lines into the to-be-analyzed line on the frequency band.

10. The apparatus according to claim 9, wherein that the analysis controller determines, according to the first and the second groups of state performance parameters, crosstalk of the second number of lines into the to-be-analyzed line on the frequency band by:
determining, according to the first and second groups of state performance parameters, crosstalk of the to-be-analyzed line into the second number of lines on the frequency band; and
determining, based on the crosstalk of the to-be-analyzed line into the second number of lines on the frequency band and according to a crosstalk dual relationship, the crosstalk of the second number of lines into the to-be-analyzed line on the frequency band.

11. The apparatus according to claim 9, wherein the first and the second groups of state performance parameters comprise transmission power, line attenuation and a signal-to-noise ratio of the second number of lines on the frequency band, and the analysis controller determines, according to the transmission power, the line attenuation and the signal-to-noise ratio which are of the second number of lines on the frequency band and comprised in the first and second groups of state performance parameters, the crosstalk of the second number of lines into the to-be-analyzed line on the frequency band.

12. The apparatus according to claim 9, wherein the analysis controller determines a crosstalk source of the to-be-analyzed line according to the determined crosstalk of the second number of lines into the to-be-analyzed line on the frequency band.

13. The apparatus according to claim 12, wherein the analysis controller determines a line which is in the second number of lines and which crosstalk into the to-be-analyzed line on the frequency band is larger than a threshold as the crosstalk source.

14. The apparatus according to claim 9, wherein the analysis controller determines, according to determined crosstalk of a line in the second number of lines into the to-be-analyzed line on the frequency band, crosstalk of the line into the to-be-analyzed line on another frequency band.

15. The apparatus according to claim 14, wherein the analysis controller determines the crosstalk $|H_{FEXT}(f)|$ of the line into the to-be-analyzed line on the another frequency band according to the following formula:

$$|H_{FEXT}(f)|^2 = |H_{channel}(f)|^2 \times k \times l \times f^2,$$

wherein $|H_{channel}(f)|$ represents a channel transmission function, and is obtained according to collected line attenuation; l represents a coupling length; k represents a coupling constant; and f represents the frequency of another band.

* * * * *

UNITED STATES PATENT AND TRADEMARK OFFICE
CERTIFICATE OF CORRECTION

PATENT NO. : 9,014,291 B2
APPLICATION NO. : 14/176227
DATED : April 21, 2015
INVENTOR(S) : Yahong Gao et al.

Page 1 of 1

It is certified that error appears in the above-identified patent and that said Letters Patent is hereby corrected as shown below:

On Title Page, Column 1, Item (71) (Applicant):

Delete "(KR)" insert --(CN)--, therefor.

Signed and Sealed this
Twenty-third Day of June, 2015

Michelle K. Lee
*Director of the United States Patent and Trademark Office*